(12) United States Patent
Fu

(10) Patent No.: US 7,737,514 B1
(45) Date of Patent: Jun. 15, 2010

(54) MEMS PRESSURE SENSOR USING AREA-CHANGE CAPACITIVE TECHNIQUE

(76) Inventor: Yee-Chung Fu, 40328 Imperio Pl., Fremont, CA (US) 94539

( * ) Notice: Subject to any disclaimer, the term of this patent is extended or adjusted under 35 U.S.C. 154(b) by 0 days.

(21) Appl. No.: 12/034,667

(22) Filed: Feb. 21, 2008

(51) Int. Cl.
*H01L 29/84* (2006.01)
(52) U.S. Cl. .............. 257/418; 257/419; 257/E29.324
(58) Field of Classification Search ............... 257/418, 257/419, E29.324
See application file for complete search history.

(56) References Cited

U.S. PATENT DOCUMENTS

| | | | |
|---|---|---|---|
| 6,311,563 B1 * | 11/2001 | Ishikura | 73/724 |
| 7,187,185 B2 | 3/2007 | Dallenbach et al. | |
| 7,385,744 B2 * | 6/2008 | Kogut et al. | 359/198.1 |
| 2005/0076719 A1 * | 4/2005 | Jakobsen et al. | 73/718 |
| 2006/0067651 A1 * | 3/2006 | Chui | 385/147 |
| 2007/0216423 A1 * | 9/2007 | Grosjean et al. | 324/661 |
| 2008/0029481 A1 * | 2/2008 | Kothari et al. | 216/58 |
| 2008/0278788 A1 * | 11/2008 | Sasagawa | 359/224 |
| 2009/0194827 A1 * | 8/2009 | Ogino et al. | 257/415 |

OTHER PUBLICATIONS

Surface Micromachined Capacitive Differential Pressure Sensor with Lithographically-Defined Silicon Diaphragm. Mastragnelo et al. Solid-state Sensors and Actuators 1995 and Eurosensors IX Jun. 1995. vol. 1 pp. 612-615.*

* cited by examiner

*Primary Examiner*—Ngan Ngo
(74) *Attorney, Agent, or Firm*—Patent Law Group LLP; David C. Hsia

(57) ABSTRACT

A micro-electro-mechanical system (MEMS) pressure sensor includes a silicon spacer defining an opening, a silicon membrane layer mounted above the spacer, and a silicon sensor layer mounted above the silicon membrane layer. The silicon membrane layer forms a diaphragm opposite of the spacer opening, and a stationary perimeter around the diaphragm and opposite the spacer. The silicon sensor layer includes a movable electrode and a stationary electrode separated by a substantially constant gap and respectively located above the diaphragm and the stationary perimeter of the silicon membrane layer. The movable electrode and the diaphragm move in response to a pressure applied to the diaphragm where an overlap area between sidewall surfaces of the movable and the stationary electrodes create a capacitance proportion to the pressure.

11 Claims, 6 Drawing Sheets

MEMS PRESSURE SENSOR USING AREA-CHANGE CAPACITIVE TECHNIQUE

FIELD OF INVENTION

This invention relates a pressure sensor, and more particular to a micro-electro-mechanical system (MEMS) pressure sensor.

DESCRIPTION OF RELATED ART

U.S. Pat. No. 7,187,185 discloses force sensors that use area-change capacitive sensing techniques to determine the magnitude of the force. These sensors are made using conventional machining processes.

In one device, a first vertical electrode is mounted on a top layer and a second vertical electrode is mounted on a bottom layer. The top and the bottom layers are separated by an inert gas. When a force is asserted, it changes the overlap area and therefore the capacitance between the vertical electrodes. The change in the capacitance can be correlated to the magnitude of the force applied to the device.

In another device, an inner conductive surface in the form of a metal tube is inserted into a middle conductive surface in the form of a hollow tube. A spacer may hold the inner conductive surface inside the middle conductive surface so they are separated by a gap. Like the earlier device, when a force is asserted, it changes the overlap area and therefore the capacitance between the conductive surfaces. The change in the capacitance can be correlated to the magnitude of the force applied to the device.

SUMMARY

In one embodiment of the invention, a micro-electro-mechanical system (MEMS) pressure sensor includes a silicon spacer, a silicon membrane layer mounted above the spacer, and a silicon sensor layer mounted above the silicon membrane layer. The silicon spacer defines an opening to the silicon membrane layer. A first portion of the silicon membrane layer opposite of the spacer opening forms a diaphragm while a second portion of the silicon membrane layer opposite of the spacer forms a stationary perimeter around the diaphragm.

The silicon sensor layer includes a movable electrode and a stationary electrode. The electrodes are separated by a conventional semiconductor manufacturing technique (e.g., etching) to create a substantially constant gap between the electrodes. The movable electrode is located above the diaphragm while the stationary electrode is located above the stationary perimeter.

The movable electrode and the diaphragm move in response to a pressure applied to the diaphragm. The vertical displacement of the movable electrode changes the overlap area between sidewall surfaces of the electrodes but not the gap between the electrodes. This in turn changes the capacitance between the electrodes by an amount linearly proportional to the change in the pressure.

In the above structure, the movable and the stationary electrodes are formed on the same membrane layer using conventional semiconductor manufacturing processes. This allows great precision to be achieved in the alignment of the electrodes, especially in controlling the gap between the electrodes, over conventional machining processes. The result is a highly accurate pressure sensor created in an efficient and cost-effective manner.

BRIEF DESCRIPTION OF THE DRAWINGS

Use of the same reference numbers in different figures indicates similar or identical elements.

DETAILED DESCRIPTION OF THE INVENTION

Figure 1:
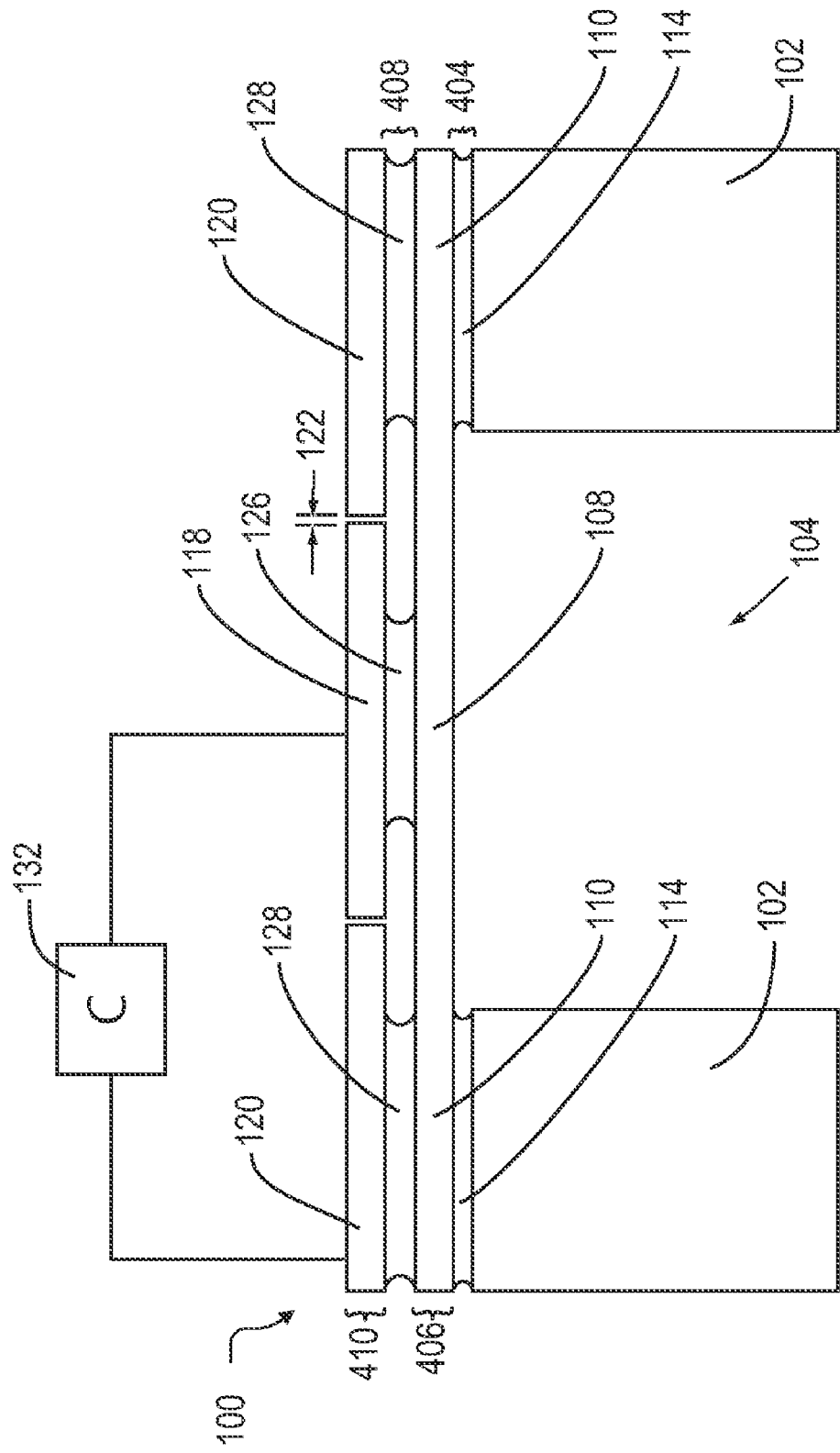
FIG. 1 illustrates a side view of a MEMS pressure sensor in one embodiment of the invention.
Figure 2:
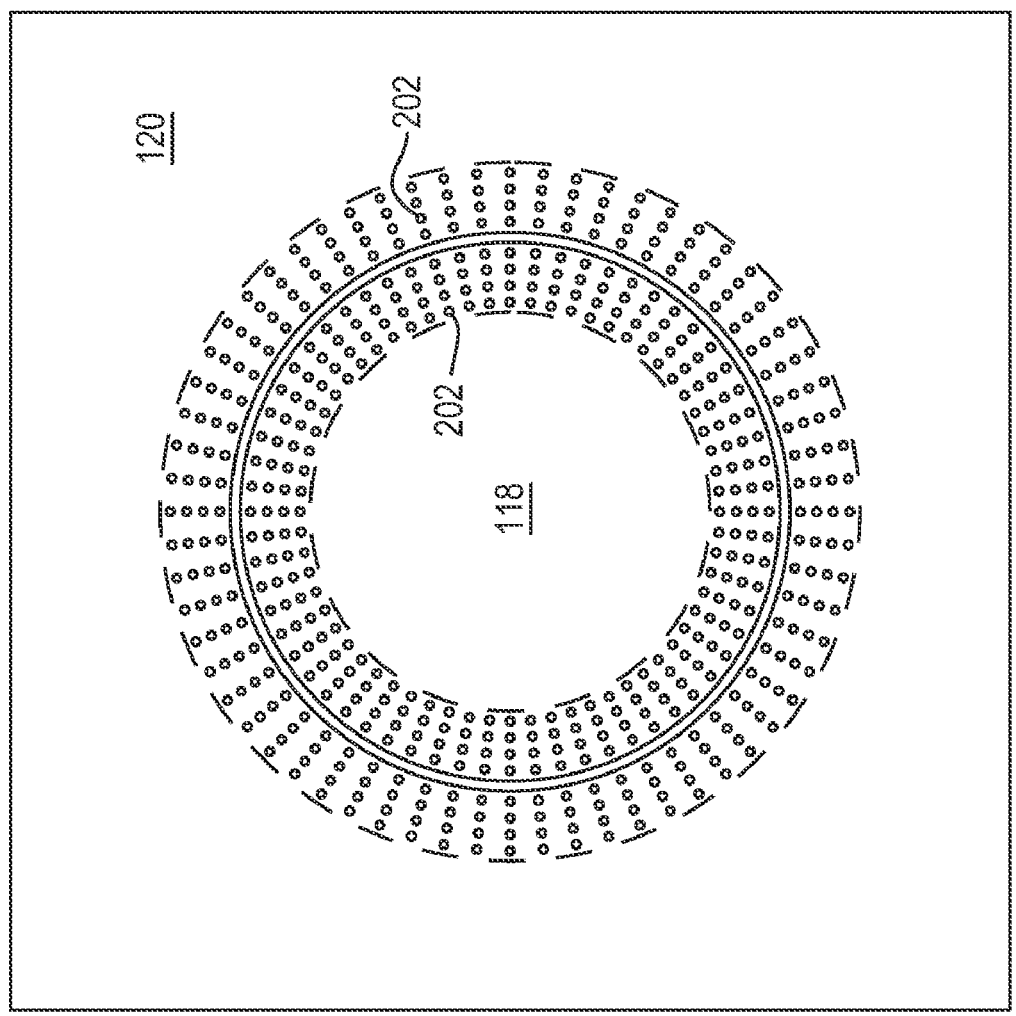
FIG. 2 illustrates a top view of the MEMS pressure sensor of FIG. 1 in one embodiment of the invention.

FIGS. 1 and 2 illustrate a MEMS pressure sensor 100 in one embodiment of the invention. Sensor 100 is formed using conventional semiconductor manufacturing processes.

Sensor 100 includes a silicon spacer 102 that defines an opening 104. A silicon membrane layer 406 is mounted above spacer 102. A portion of membrane layer 406 exposed by opening 104 forms a diaphragm 108 and a portion mounted above spacer 102 forms a stationary perimeter 110 around the diaphragm. In one embodiment, opening 104 is a round opening and diaphragm 108 is therefore round.

A first oxide layer 404 has a portion 114 between spacer 102 and stationary perimeter 110. As will be describe later, oxide layer 404 acts as an etch stop in the process for making opening 104 in spacer 102.

A silicon sensor layer 410 is mounted above membrane layer 406. Sensor layer 410 includes a movable electrode 118 and a stationary electrode 120 around the movable electrode. Movable electrode 118 is located substantially above diaphragm 108 while stationary electrode 120 is located substantially above stationary perimeter 110. Movable electrode 118 and stationary electrode 120 are separated by a gap 122.

A second oxide layer 408 has a portion 126 between movable electrode 118 and diaphragm 108, and a portion 128 between stationary electrode 120 and stationary perimeter 110. Oxide layer 408 acts as an insulating layer to prevent electrodes 118 and 120 from being shorted.

FIG. 2 illustrates one embodiment where movable electrode 118 is a disk and stationary electrode 120 has a round inner perimeter that matches the shape of the movable electrode. As a result of oxide etch and release of movable electrode 118 and stationary electrode 120 from oxide layer 408, holes 202 (only two are labeled for clarity) are formed on the outer circumference of movable electrode 118 and the inner circumference of stationary electrode 120. Note that the phantom lines shown indicate the perimeter of oxide portions 126 and 128 from oxide layer 408 (FIG. 1).

Referring back to FIG. 1, the capacitance between the electrodes can be sensed by a capacitance sensing circuit 132 when a voltage is supplied to electrodes 118 and 120. The value of the capacitance depends on the overlap area and the gap between the sidewalls of electrodes 118 and 120 as follows:

$$C = \epsilon_0 A/d,$$

where C is the capacitance, $\epsilon_0$ is the permittivity of free space, A is the overlap area between the electrodes, and d is the gap distance.

Figure 3:
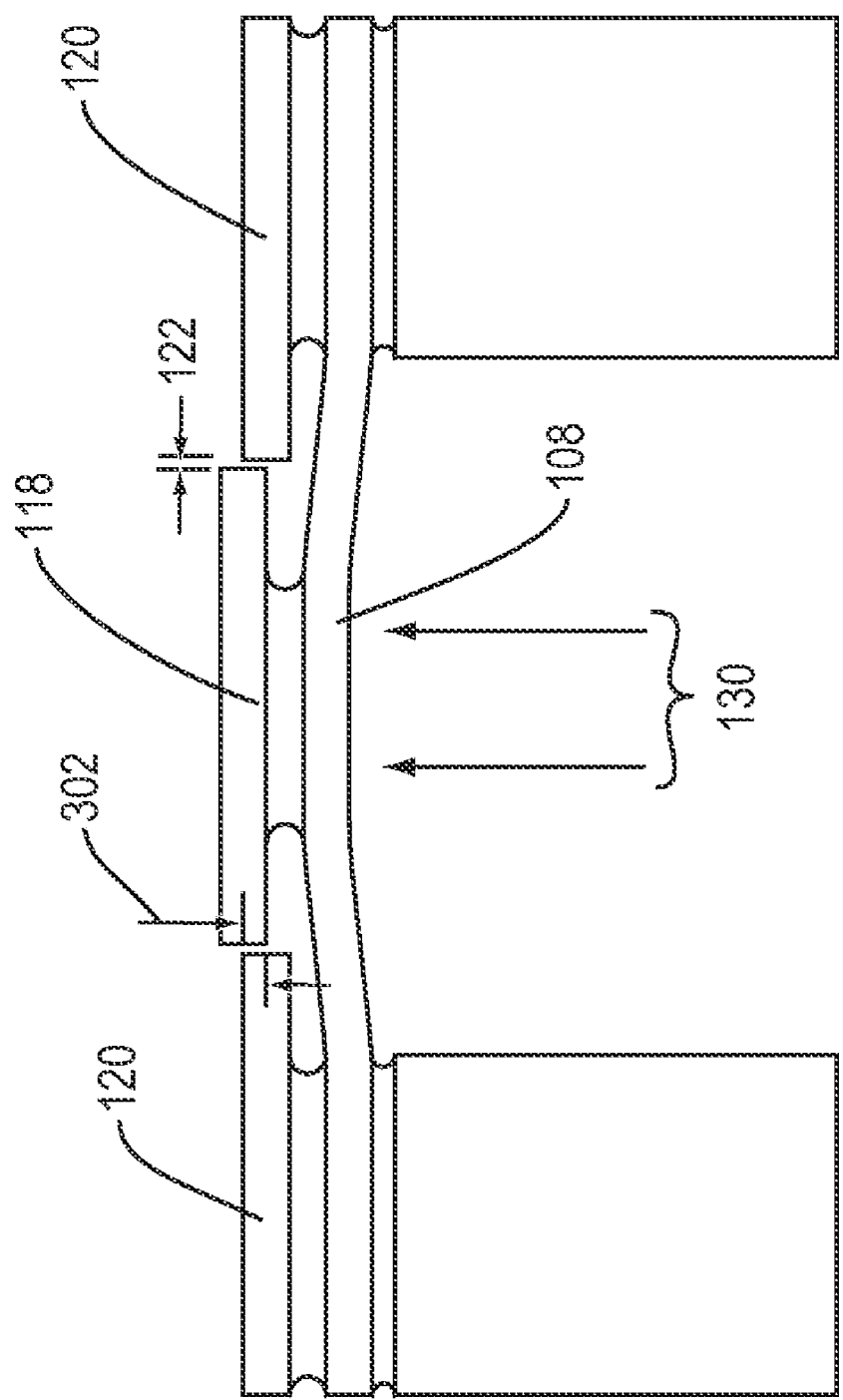
FIG. 3 illustrates a side view of the MEMS pressure sensor of FIG. 1 under pressure in one embodiment of the invention.

Referring to FIG. 3, a pressure difference between the opposing sides of diaphragm 108 (simply illustrated as pressure 130 asserted on the diaphragm) causes the diaphragm and movable electrode 118 to translate. As the pressure is evenly distributed across diaphragm 108, the translation of the diaphragm and movable electrode 118 are substantially vertical so gap 122 between the movable electrode and stationary electrode 120 remain substantially constant.

This vertically translation of movable electrode 118 changes the overlap area (symbolically illustrated by a distance 302) between sidewalls of movable electrode 118 and stationary electrode 120. The change in the overlap area changes the capacitance between electrodes 118 and 120. The change in the capacitance is linearly proportional to the change in pressure 130. The exact relationship can be mathematically or empirically determined to find the change in pressure 130.

FIGS. 4A, 4B, 4C, and 4D illustrate a method for making sensor 100 using convention semiconductor manufacturing processes in one embodiment of the invention. In the first step illustrated in FIG. 4A, a double silicon-on-insulator substrate 400 is provided. Substrate 400 includes a first silicon layer 402, a first oxide layer 404 above silicon layer 402, a second silicon layer 406 above oxide layer 404, a second oxide layer 408 above silicon layer 406, and a third silicon 410 above oxide layer 408. As used here, a silicon layer refers to any material with silicon, including single crystal silicon, polysilicon, and silicon carbide. Silicon layer 406 can be selected to be stiff or soft depending on the sensitivity to pressure desired for sensor 100.

Figure 4A:
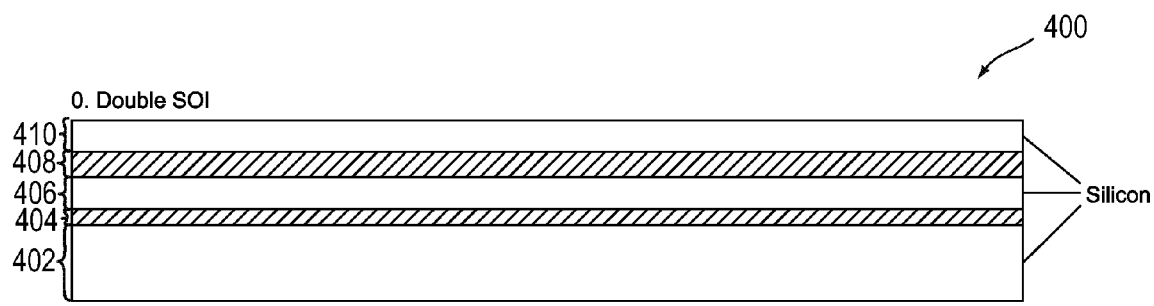
FIGS. 4A, 4B, 4C, and 4D illustrate a process for making the MEMS pressure sensor of FIG. 1 in one embodiment of the invention.
Figure 4B:
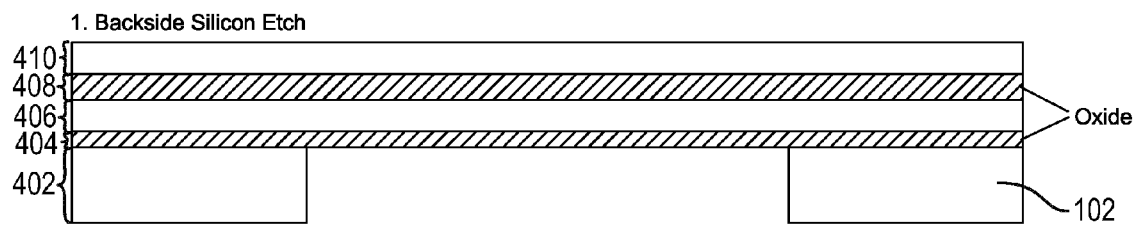

In the second step illustrated in FIG. 4B, silicon layer 402 is etched down to oxide layer 404 to form spacer 102 with opening 104. In this step, oxide layer 404 acts as an etch stop.

Figure 4C:
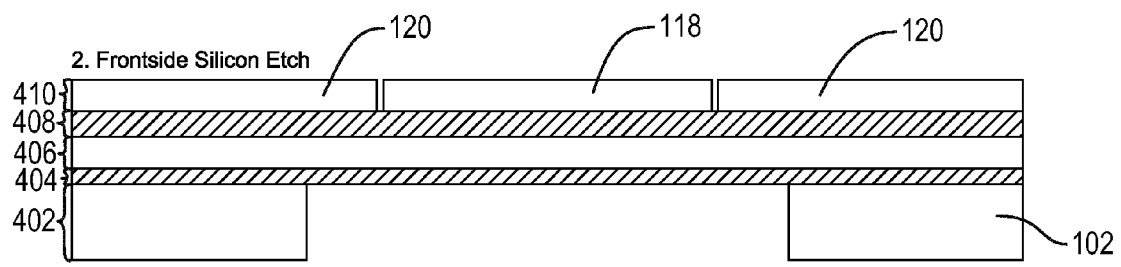

In the third step illustrated in FIG. 4C, silicon layer 410 is etched to form electrodes 118 and 120. Also in this step, holes 202 (FIG. 2) are etched in the outer perimeter of electrode 118 and the inner perimeter of 120 in preparation for the oxide etch and release in the next step.

Figure 4D:
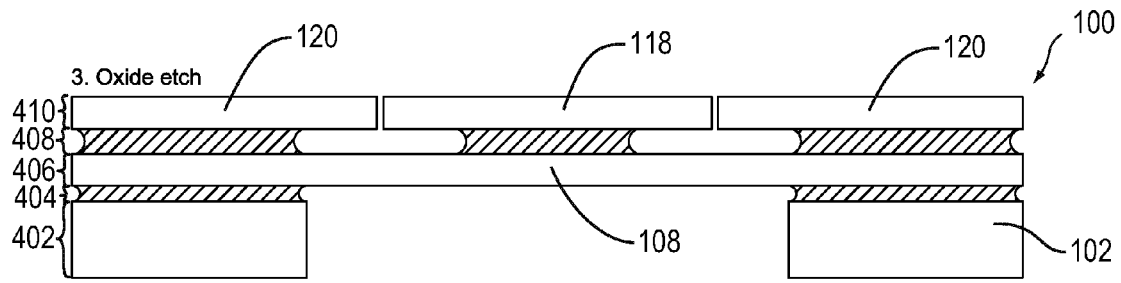

In the fourth step illustrated in FIG. 4D, an oxide etch is performed to remove portions of oxide layer 404 and 408 exposed by silicon layers 402 and 410. Specifically, this releases electrode 118 and diaphragm 108 from the remainder of the structure so they can translate vertically under a change in pressure.

Figure 5:
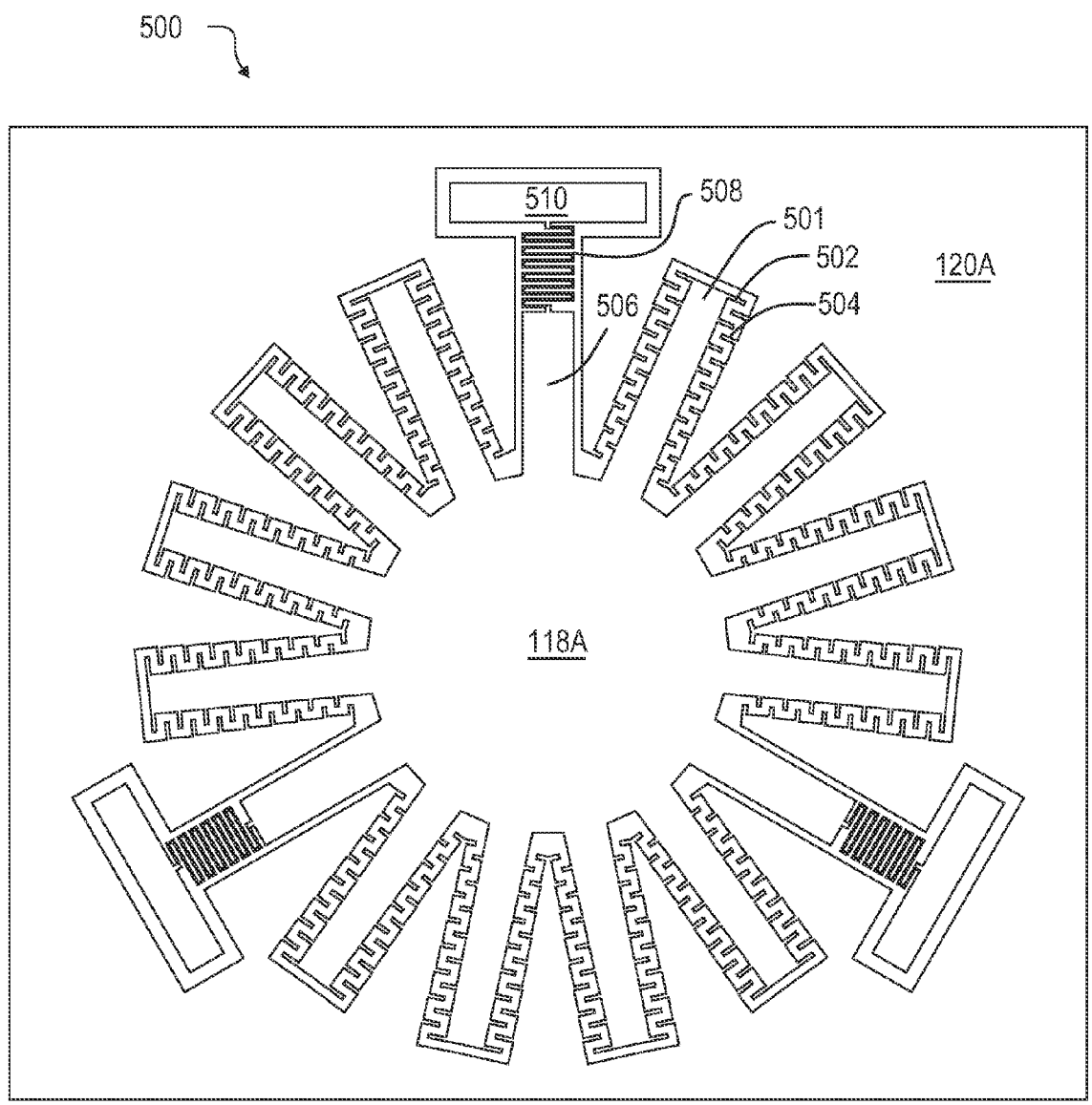
FIG. 5 illustrates a top view of the MEME pressure sensor of FIG. 1 in another embodiment of the invention.

FIG. 5 illustrates a variation of MEMS pressure sensor 100 (hereafter "sensor 500") in one embodiment of the invention. Sensor 500 is essentially the same as sensor 100 except that a movable electrode 118A now has spokes 501 with teeth 502 that are interdigitated with teeth 504 (only one of each is labeled for clarity) from a stationary electrode 120B. Teeth 502 and 504 increase the overlap area between electrodes 118A and 120A at any vertical displacement in order to make sensor 500 more sensitive to pressure changes. In addition, movable electrode 118 has spokes 505 that are coupled by springs 506 to stationary pads 510 (only one of each is labeled for clarity) insulated from stationary electrode 120A. This allows wire bonds to be formed two or more stationary pads 510 for coupling to voltage sources. While interdigitated teeth are shown, other complementary features may be used to increase the overlap area between electrodes 118A and 120A.

Figure 6:
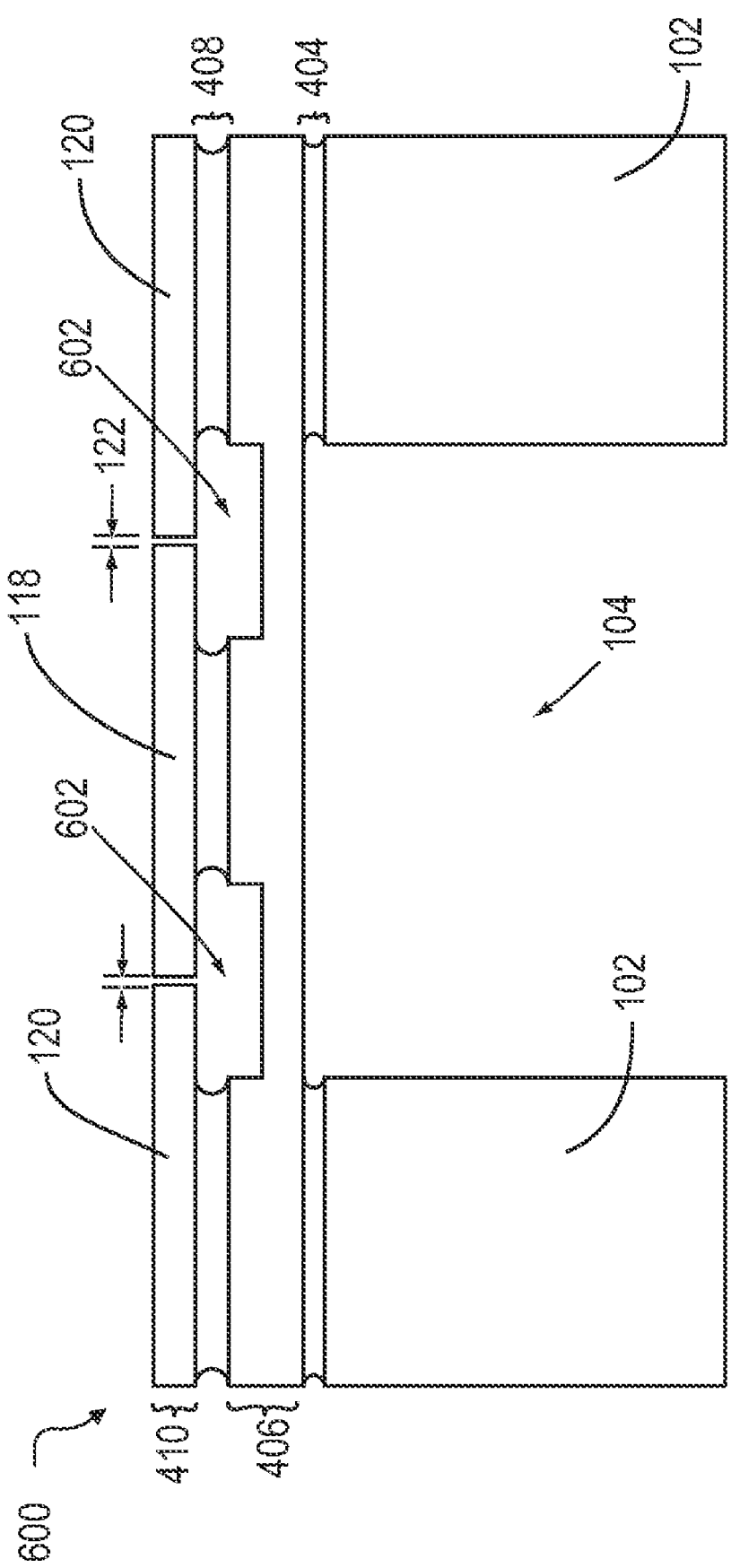
FIG. 6 illustrates a side view of a MEMS pressure sensor in one embodiment of the invention.

FIG. 6 illustrates a variation of MEMS pressure sensor 100 (hereafter "sensor 600") in one embodiment of the invention. Sensor 600 is essentially the same as sensor 100 except a channel 602 on the top surface of membrane layer 406 is formed below gap 122. Channel 602 allows membrane layer 406 to be more flexible so it can translate under smaller pressure differences. In the fabrication of sensor 600, spacer 102, oxide layer 404, and membrane layer 406 can be made from a single SOI substrate. Channel 602 is formed by etching the top surface of membrane layer 406, and then forming oxide layer 408 and bonding sensor layer 410 above of oxide layer 408.

Various other adaptations and combinations of features of the embodiments disclosed are within the scope of the invention. Instead of using single or double SOI substrates to form the sensors, multiple silicon substrate can be bonded together to form the sensors where the oxide layer is grown or deposited on the substrates. Furthermore, although the movable electrode is described as being enclosed by the stationary electrode, the design can be modified where the movable electrode encloses the stationary electrode. Numerous embodiments are encompassed by the following claims.

The invention claimed is:

1. A micro-electro-mechanical system (MEMS) pressure sensor, comprising:
    a silicon membrane layer forming a diaphragm opposite an opening and a stationary perimeter around the diaphragm; and
    a silicon sensor layer mounted above the silicon membrane layer, the silicon sensor layer comprising a movable electrode above the diaphragm and a stationary electrode above the stationary perimeter, sidewalls of the movable and the stationary electrodes being separated by a substantially constant gap;
    wherein the movable electrode and the diaphragm move in response to a pressure applied to the diaphragm, and a change in an overlap area between the sidewalls of the movable and the stationary electrodes create a change in capacitance that is proportional to a change in the pressure.

2. The sensor of claim 1, wherein the stationary electrode surrounds the movable electrode.

3. The sensor of claim 2, wherein the movable electrode is a disk and the stationary electrode has a circular inner perimeter.

4. The sensor of claim 2, wherein the movable electrode is a disk with a plurality of spokes having a first plurality of teeth and the stationary electrode has a second plurality of teeth interdigitated with the first plurality of teeth.

5. The sensor of claim 4, wherein the movable electrode further comprises another plurality of spokes coupled by springs to stationary pads, and the stationary pads are coupled to voltage sources.

6. The sensor of claim 1, further comprising a capacitance sensing circuit coupled to the movable and the stationary electrodes.

7. The sensor of claim 1, wherein the silicon membrane layer is selected from the group consisting of single crystal silicon, polysilicon, and silicon carbide.

8. The sensor of claim 1, wherein the silicon membrane layer comprises a channel below the gap between the movable and the stationary electrodes and around a perimeter of the diaphragm.

9. The sensor of claim 1, further comprising:
a silicon spacer defining the opening, wherein the silicon membrane layer is mounted above the spacer to form the diaphragm opposite of the opening and the stationary perimeter around the diaphragm.

10. The sensor of claim 9, further comprising:
a first oxide layer between the stationary perimeter of the silicon membrane layer and the spacer; and
a second oxide layer comprising a first portion between the movable electrode and the diaphragm of the silicon membrane layer, and a second portion between the stationary electrode and stationary perimeter of the silicon membrane layer.

11. The sensor of claim 10, wherein the spacer, the first oxide layer, the silicon membrane layer, the second oxide layer, and the silicon sensor layer comprise a double silicon-on-insulator substrate.

* * * * *